United States Patent [19]

Carter et al.

[11] Patent Number: 5,123,341

[45] Date of Patent: Jun. 23, 1992

[54] SOLID WASTE COMPACTOR WITH MULTIPLE RECEPTACLES

[76] Inventors: Neil A. Carter, 2 Cholla Cir., Santa Fe, N. Mex. 87501; John A. Roth, Star Rte. Box 24, Placitas, N. Mex. 87403

[21] Appl. No.: 464,358

[22] Filed: Jan. 12, 1990

[51] Int. Cl.$^5$ .............................................. B30B 15/00
[52] U.S. Cl. ....................................... 100/223; 100/221; 100/229 A
[58] Field of Search .................... 100/221, 223, 229 A, 100/290

[56] References Cited

U.S. PATENT DOCUMENTS

| | | | |
|---|---|---|---|
| 737,427 | 8/1903 | Lemberg | 100/246 |
| 2,984,957 | 5/1961 | Lundgren | 100/221 X |
| 3,353,478 | 11/1967 | Hopkins | 100/229 A |
| 3,358,590 | 12/1967 | Howard | 100/229 A |
| 3,438,321 | 4/1969 | Gladwin | 100/221 |
| 3,495,376 | 9/1970 | Lundgren | 53/124 |
| 3,531,909 | 10/1970 | Edelbalk | 100/223 X |
| 3,537,390 | 11/1970 | Hinkel et al. | 100/229 A X |
| 3,540,495 | 11/1970 | Lundgren | 100/229 A X |
| 3,680,478 | 8/1972 | Beachner, Jr. et al. | 100/229 A |
| 3,685,438 | 8/1972 | Ziegler | 100/48 |
| 3,720,844 | 3/1973 | Sahs | 100/229 A X |
| 3,734,006 | 5/1973 | Hernells | 100/229 A X |
| 3,734,009 | 5/1973 | Engebretsen | 100/229 A |
| 3,753,400 | 8/1973 | Miller | 100/229 A X |
| 3,757,683 | 9/1973 | Engebretsen et al. | 100/229 A |
| 3,772,987 | 11/1973 | Difley et al. | 100/229 A X |
| 3,808,967 | 5/1974 | Fair et al. | 100/221 |
| 3,841,214 | 10/1974 | Engebretsen | 100/229 A X |
| 3,862,593 | 1/1975 | Engebretsen | 100/290 X |
| 3,863,561 | 2/1975 | Karls | 100/53 |
| 3,905,289 | 9/1975 | Engebretsen | 100/229 A X |
| 4,113,125 | 9/1978 | Schiller | 214/302 |
| 4,188,877 | 2/1980 | Khan | 100/229 A X |
| 4,463,669 | 8/1984 | Van Doorn et al. | 100/43 |
| 4,833,866 | 5/1989 | Newton et al. | 100/229 A X |

Primary Examiner—Paul T. Sewell
Attorney, Agent, or Firm—William A. Eklund

[57] ABSTRACT

A solid waste compactor having multiple waste receptacles for separately receiving, temporarily holding, and compacting separate classes of solid waste, for example paper, glass, aluminum cans and steel cans. In one preferred embodiment there is a single screw-driven compaction ram which compacts solid waste in the several receptacles, which are rotatable into position beneath the ram on a revolving table. In an alternative embodiment there are multiple compaction rams for the multiple receptacles, with all the compaction rams being driven in series by means of a common drive chain, and with the receptacles being mounted on a slidable carriage for removal from the compactor.

4 Claims, 20 Drawing Sheets

SOLID WASTE COMPACTOR WITH MULTIPLE RECEPTACLES

TECHNICAL FIELD

The invention disclosed and claimed herein is generally related to apparatus for compacting trash, refuse or other solid waste. More particularly, the present invention is related to solid waste compactors for domestic and commercial use.

BACKGROUND ART

Trash compactors have become increasingly popular in recent years, in both domestic and commercial applications. Nevertheless, the advent of recycling practices, and more particularly the advent of recycling practices directed to the separate collection and disposal of different kinds of solid waste, has made it apparent that previously available trash compactors suffer from certain disadvantages. For example, most of the previously known solid waste compactors, and virtually all of the compactors that are commercially available for domestic use, include only a single compaction receptacle, in which solid wastes, for example paper, glass, aluminum cans and steel cans, are mixed and compacted together. Although such compactors are acceptable where it is desired to discard different kinds of waste in mixed form, they are not conducive to the separate disposal and recycling of different categories of solid waste, for example paper, aluminum, glass and steel.

Several compactors having two or more waste receptacles have been proposed in the prior art, as described for example in some of the references cited below. However, the introduction of multiple waste receptacles in the prior art compactors results new problems. For example, such compactors are typically large and unwieldy, and for this reason are generally unsuitable for domestic or light commercial use. Where a single compaction ram is employed with multiple waste receptacles, complex structures have been necessary to move the ram about on tracks or rails. The alternative, namely the use of multiple, independently actuated rams in the manners disclosed in the prior art, is also complex and costly. Moreover, in the prior art compactors having multiple waste receptacles, the particular structures associated with the use of multiple receptacles renders it difficult to readily discard waste into each of the several receptacles, and to remove the receptacles from the compactor assembly for emptying and disposal of the compacted waste.

As noted above, a number of solid waste compactors are disclosed in the prior art. For example, U.S. Pat. No. 737,427, issued Aug. 25, 1903 to Lemberg, discloses a machine for compressing detinned iron and steel scraps. The machine includes stationary plungers and corresponding boxes, which are raised upward hydraulically to compress scraps contained in the boxes.

U.S. Pat. No. 4,113,125, issued Sep. 12, 1978 to Schiller, discloses a refuse vehicle having multiple chambers for receiving different categories of refuse, with pressing plates in the chambers for compressing the refuse and for ejecting it from the vehicle.

U.S. Pat. No. 3,495,376, issued Nov. 29, 1970 to Lundgren, discloses a refuse collecting machine which includes multiple refuse-containing compartments and a compressing device which is movable over the compartments and which is pressed downwardly to compress refuse therein.

U.S. Pat. No. 3,685,438, issued Aug. 22, 1972 to Ziegler, discloses a refuse compactor for use with a portable refuse container.

U.S. Pat. No. 3,438,321, issued on Apr. 15, 1969 to Gladwin, discloses a trash compressor having a single ram which is selectively positionable on a set of tracks over one of two receptacles.

U.S. Pat. No. 3,808,967, issued May 7, 1974 to Fair et al., discloses a two-station trash compactor having a single hydraulic ram which is movable on rails over a pair of trash containers.

U.S. Pat. No. 3,863,561, issued Feb. 4, 1975 to Karls, discloses a top-loading compactor having a bellows-covered, mechanical scissors-type ram assembly which is movable on rails over a pair of trash containers.

U.S. Pat. No. 4,463,669, issued Aug. 7, 1984 to Van Doorn et al., discloses a system having multiple receiving bins for receiving textile waste, and a transfer mechanism for selectively moving each bin back and forth between a filling station and a compression station.

In view of the foregoing, it is the object and purpose of the present invention to provide a solid waste compactor which is capable of separately receiving, temporarily holding, and compacting multiple classes of trash, refuse or other solid waste, particularly including recyclable solid waste.

It is also an object and purpose of the present invention to provide a solid waste compactor which attains the foregoing objects and purposes in a compact apparatus suitable for domestic as well as commercial use.

It is another object and purpose of the present invention to provide a solid waste compactor which attains the foregoing objects and purposes, and which also includes means facilitating the introduction of solid waste into each of multiple solid waste receptacles, and which also includes means facilitating the removal of such receptacles from the compactor for emptying.

DISCLOSURE OF INVENTION

The foregoing objects and purposes are attained in the solid waste compactor of the present invention, which includes multiple upwardly opening solid waste receptacles which are removably mounted on movable means within a compactor housing. The compactor further includes compaction ram means supported within the housing, and which is operable to compact downwardly solid waste contained in the receptacles. The compactor further includes an electric motor mounted within the housing and connected to the compaction ram means, and which is operable to selectively drive the compaction ram means downwardly into the receptacles and also to raise the compaction means upwardly into a storage position.

In a first preferred embodiment there is a single electrically driven, screw-type compaction ram which compacts solid waste downwardly into each of the solid waste receptacles. The receptacles are mounted on a rotatable carousel that enables the receptacles to be successively rotated into position beneath the ram for compaction of waste contained therein. An indexing motor may be provided to rotate the carousel and to index the receptacles beneath the compaction ram.

In an alternative preferred embodiment there is a separate compaction ram for each receptacle. The several receptacles are mounted on a sliding carriage, on which the receptacles may be withdrawn from the compactor for introduction of solid waste, or for removal of the receptacles for disposal of compacted solid waste contained therein.

These and other aspects of the present invention will be more apparent upon consideration of the following detailed description of the best modes for carrying out the invention, when taken with the accompanying drawings.

BRIEF DESCRIPTION OF DRAWINGS

The accompanying drawings constitute a part of this specification, and are hereby incorporated by reference.

In the Drawings.

BEST MODES FOR CARRYING OUT THE INVENTION

Figure 1:
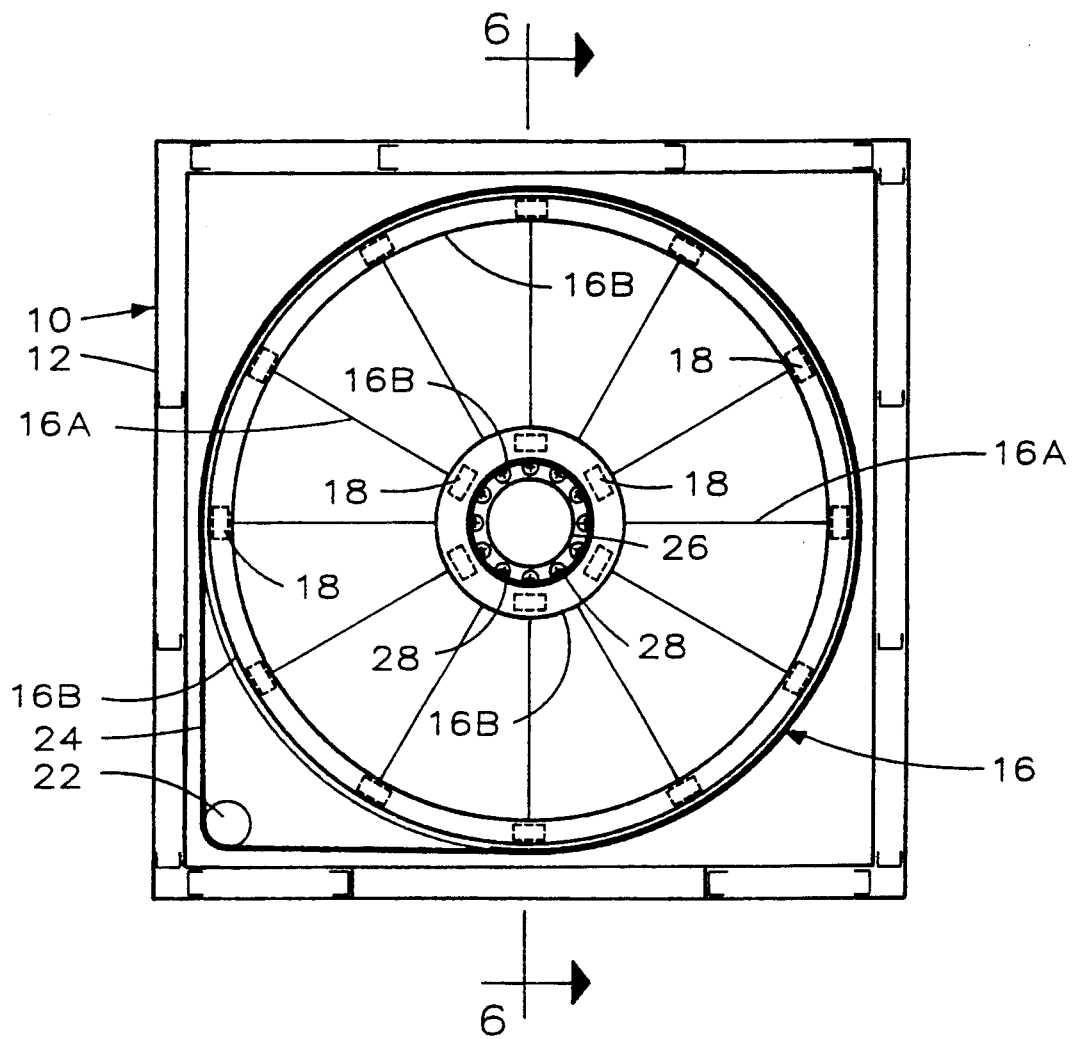
FIG. 1 is a plan view in cross section of a first preferred embodiment of the solid waste compactor of the present invention, in which a single compaction ram operates to compact solid waste in each of six rotatable receptacles, and which is taken along section line 1—1 of FIG. 6.
Figure 2:
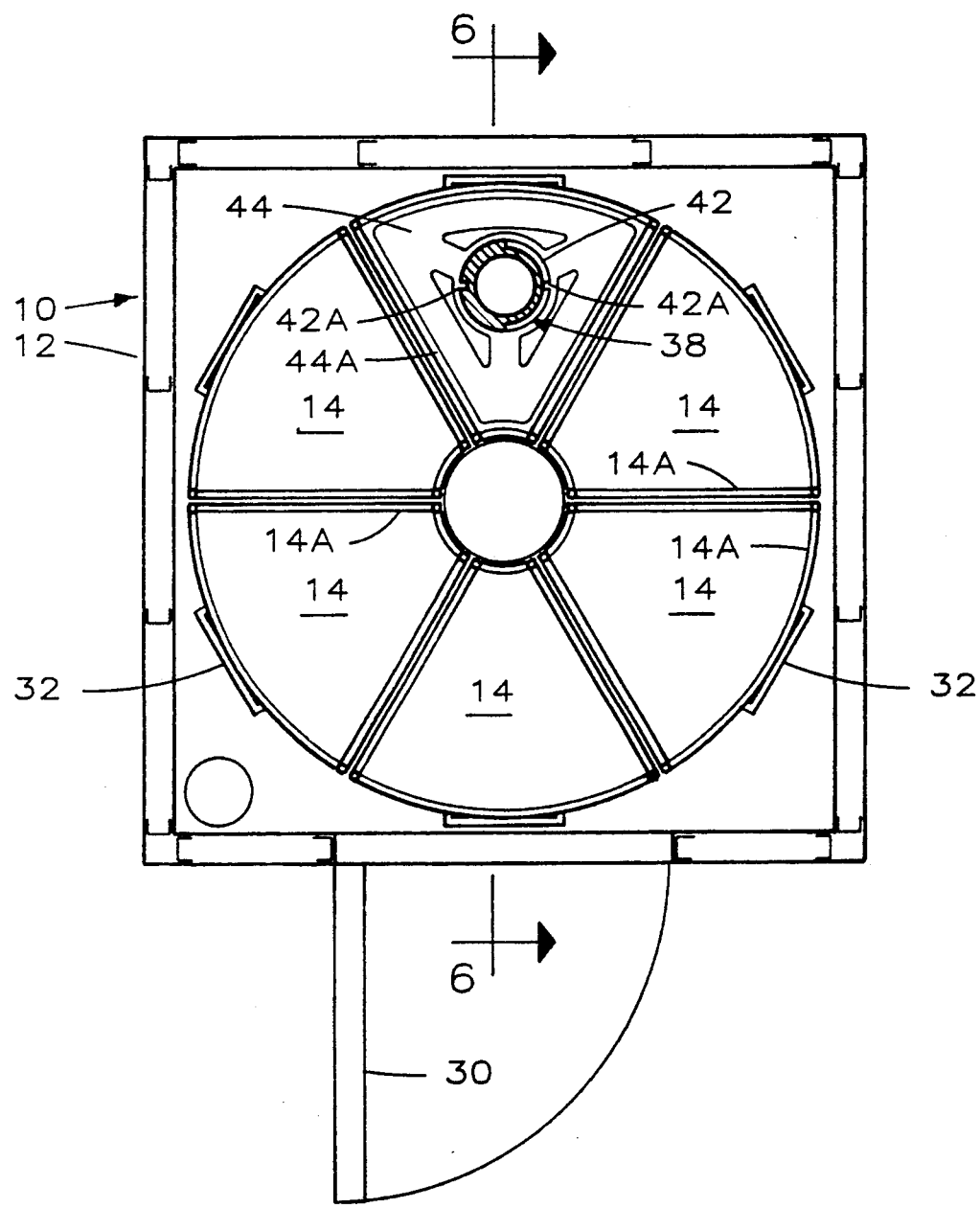
FIG. 2 is a plan view in cross section of the solid waste compactor of FIG. 1, taken along section line 2—2 of FIG. 6.
Figure 3:
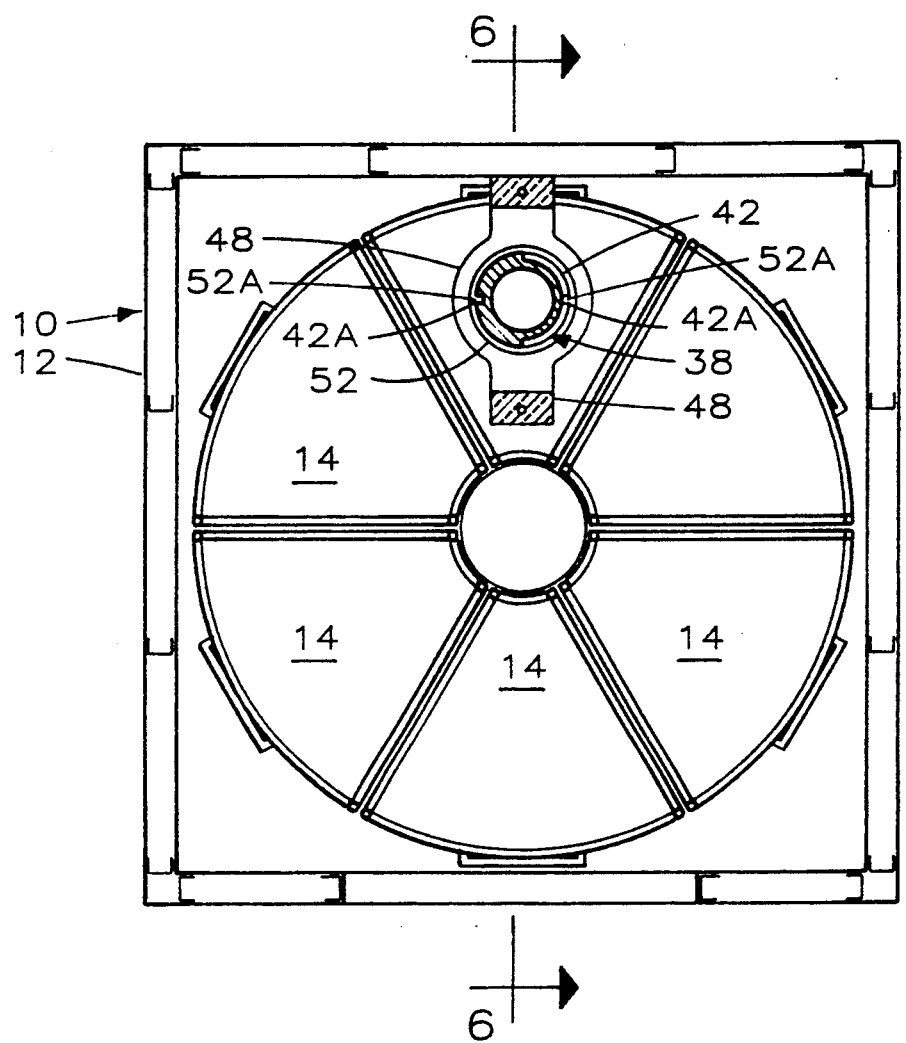
FIG. 3 is a plan view in cross section of the solid waste compactor of FIG. 1, taken along section line 3—3 of FIG. 6.
Figure 4:
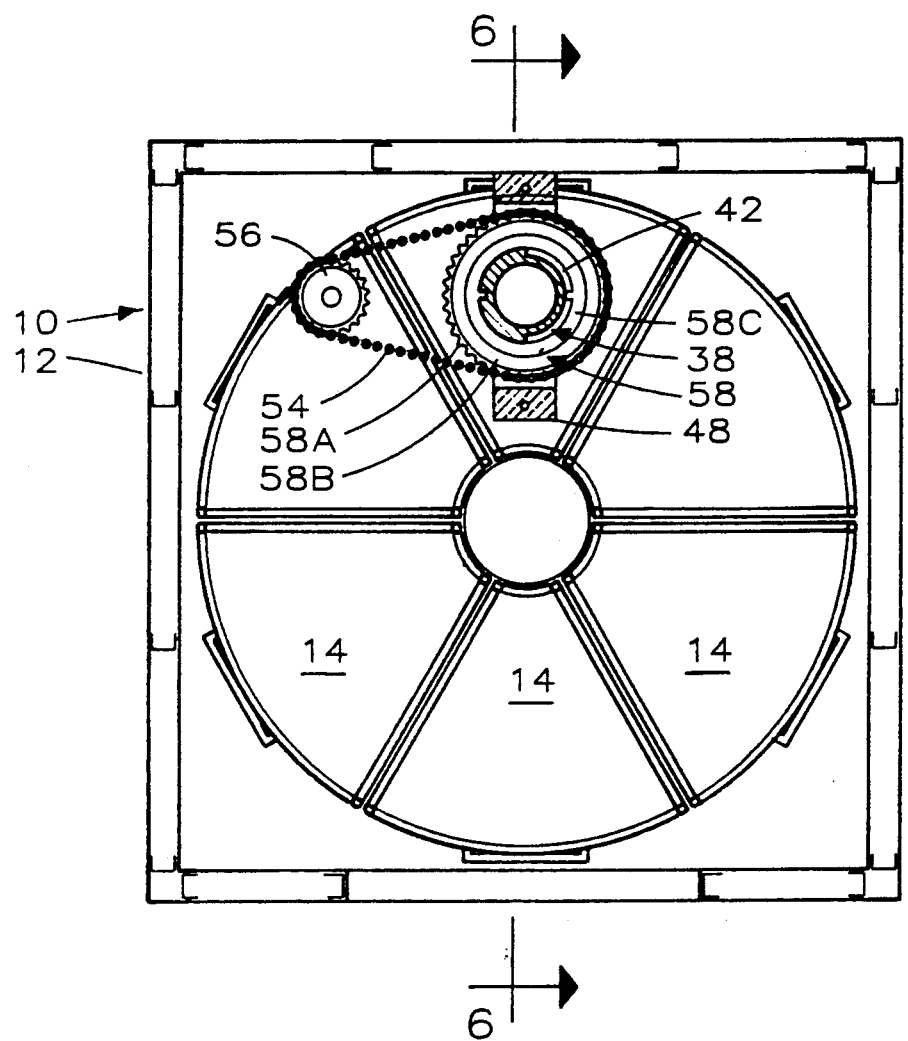
FIG. 4 is a plan view in cross section of the solid waste compactor of FIG. 1, taken along section line 4—4 of FIG. 6.

Referring first to FIGS. 1 through 6, there is illustrated a solid waste compactor 10 which constitutes a first preferred embodiment of the present invention. The compactor 10 includes a double-walled housing, or frame, 12, which contains six substantially identical wedge-shaped solid waste receptacles 14, each having reinforced corrugated walls 14a. The receptacles 14 are positioned together to form a compact cylindrical array, and rest upon a circular carousel 16 provided with radially extending support ribs 16a and concentric support ribs 16b. The carousel 16 rotates on bearing rollers 18 which are captured in a circular track 20a that is formed in a carousel support 20. The carousel 16 and receptacles 14 are driven in rotation by a carousel indexing motor 22 and an associated indexing belt 24, extends around the periphery of the carousel 16 and around a drive pulley on the motor 22. The carousel rotates around a central axis sleeve 26 which is provided with radial rollers 28.

The receptacles 14 are removable from the carousel 16 through a receptacle access door 30 provided in the lower half of the housing 12. Each receptacle 14 is provided with a handle 32 to facilitate removal from and placement of the receptacle 14 back into the compactor 10. The carousel 16 includes registration tabs (not shown) which cause the receptacles 14 to be placed onto the carousel 16 in the same locations each time the receptacles 14 are reintroduced into the compactor 10. The housing 12 further includes a solid waste access door 34, which opens outwardly to allow solid waste to be introduced into the compactor 10. Trash is guided into the underlying receptacles 14 by a solid waste hopper liner 36 which is positioned inside and adjacent to the access door 34, and which is configured in a funnel configuration adapted to funnel solid waste into the upwardly opening receptacle 14 located immediately below the hopper liner 36. In operation, the carousel 16 is rotated until a desired receptacle 14, corresponding to the particular type of solid waste to be discarded, is located beneath the access door 34 and the hopper liner 36.

Figure 5:
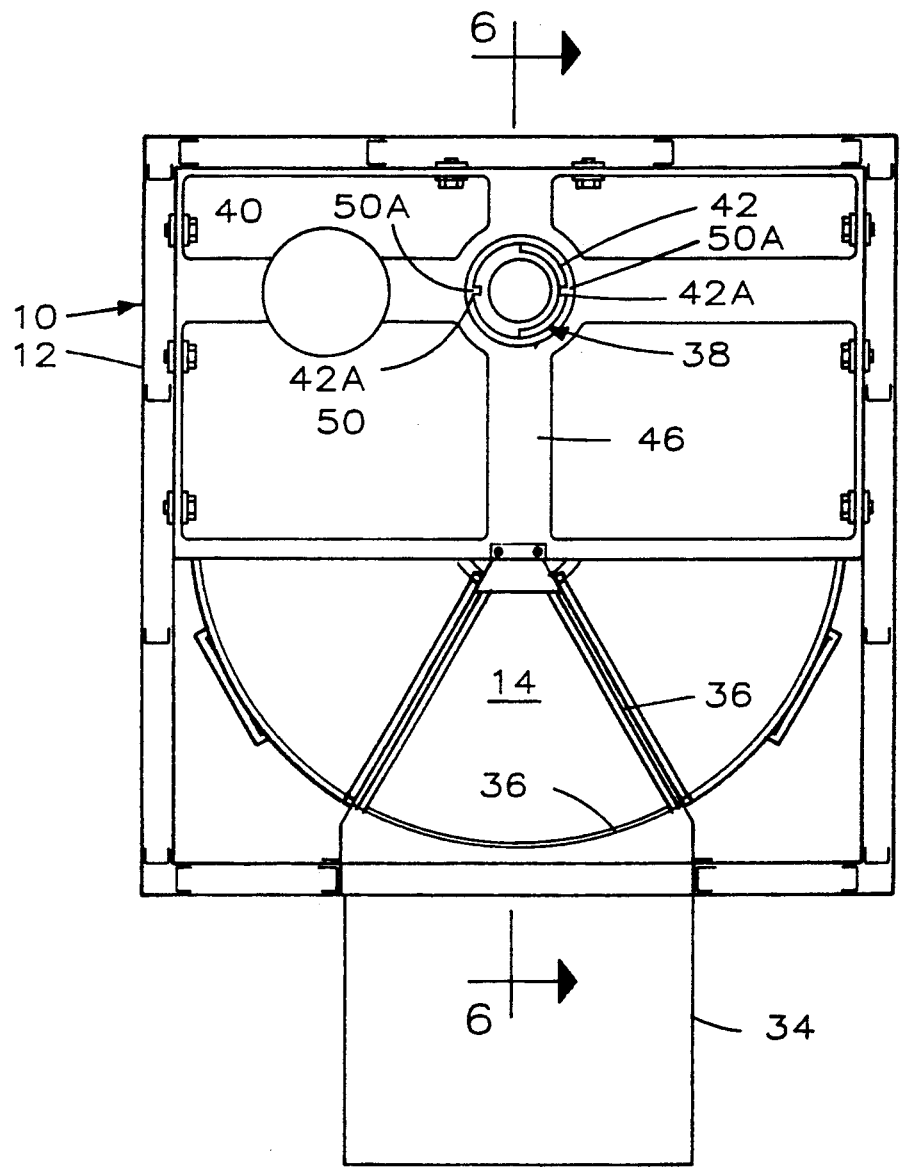
FIG. 5 is a plan view in cross section of the solid waste compactor of FIG. 1, taken along section line 5—5 of FIG. 6.
Figure 6:
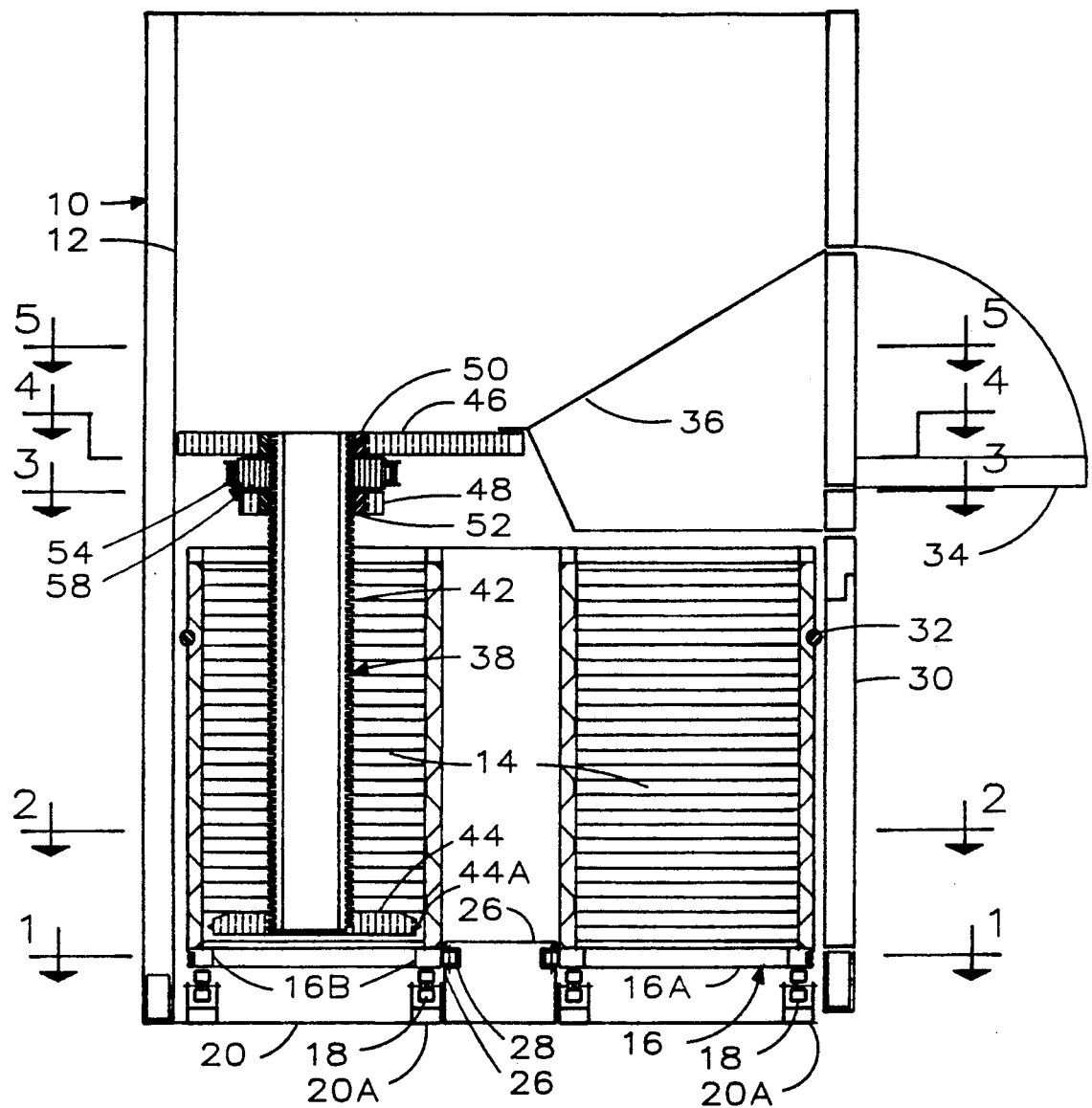
FIG. 6 is a side view in cross section of the solid waste compactor of FIG. 1, taken along section line 6—6 of FIG. 1.
Figure 7:
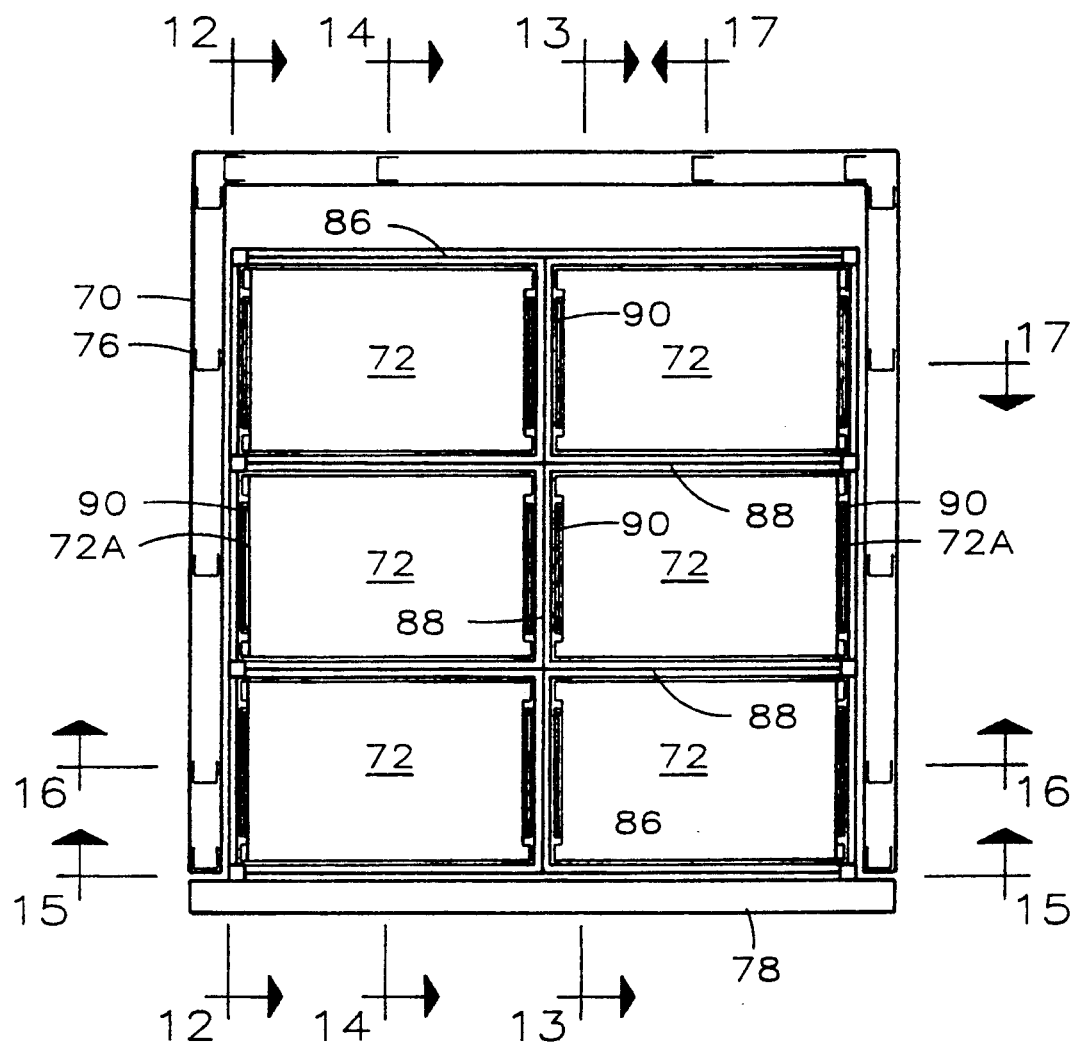
FIG. 7 is a plan view of a second preferred embodiment of the invention, taken in cross section along section line 7—7 of FIG. 12, and in which there are multiple solid waste receptacles and corresponding multiple compaction rams which are synchronously driven.
Figure 8:
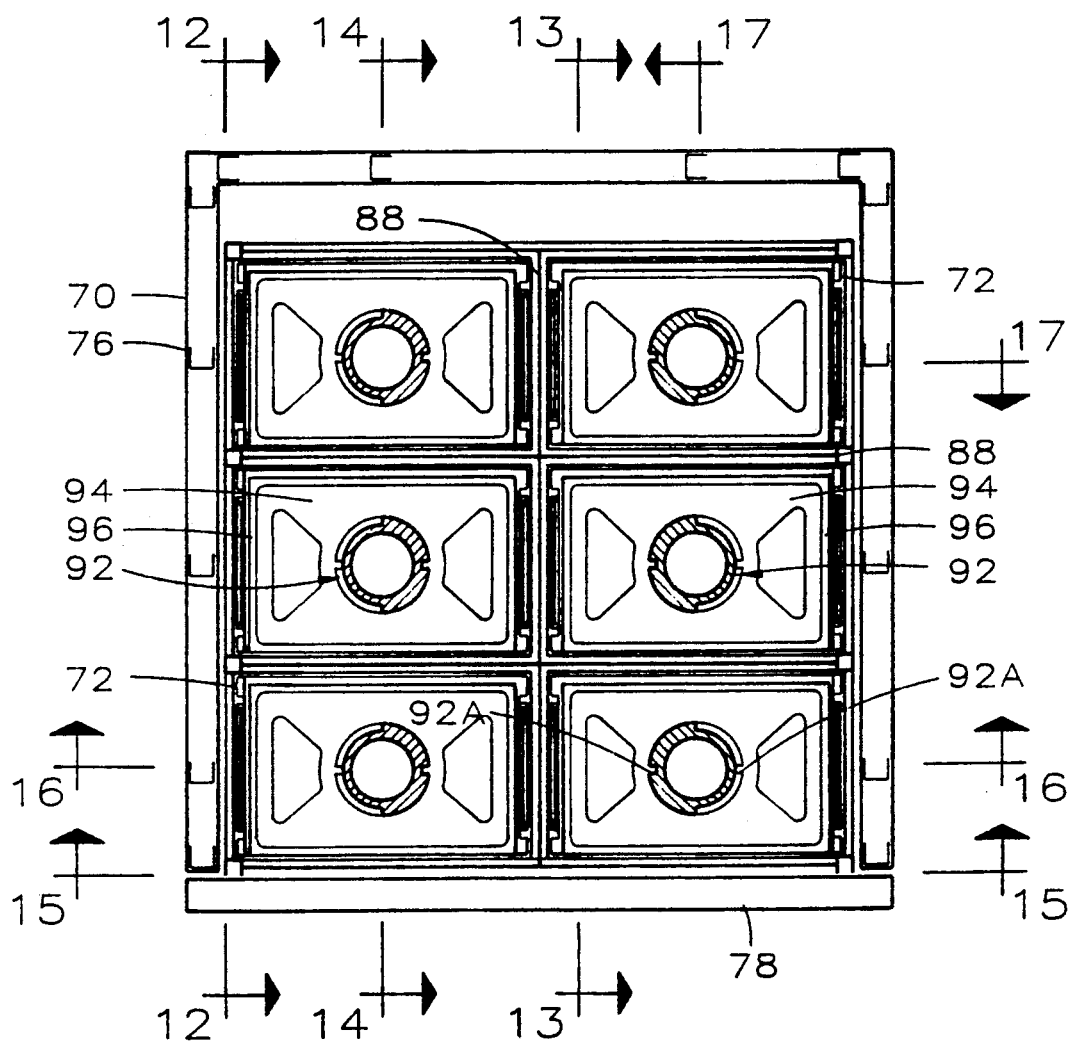
FIG. 8 is a plan view in cross section, taken along section line 8—8 of FIG. 12, of the second preferred embodiment shown in FIG. 7.
Figure 9:
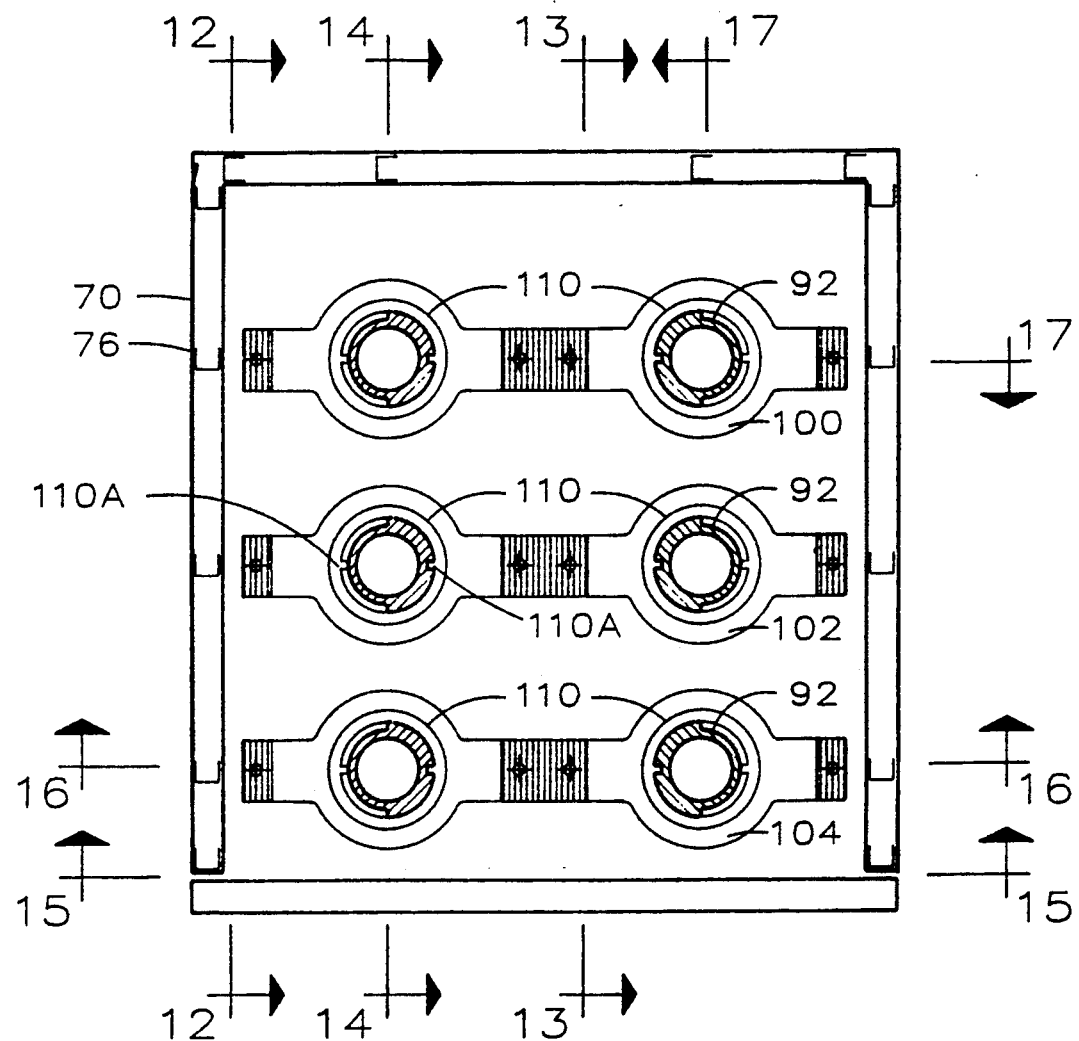
FIG. 9 is a plan view in cross section, taken along section line 9—9 of FIG. 12, of the second preferred embodiment shown in FIG. 7.
Figure 10:
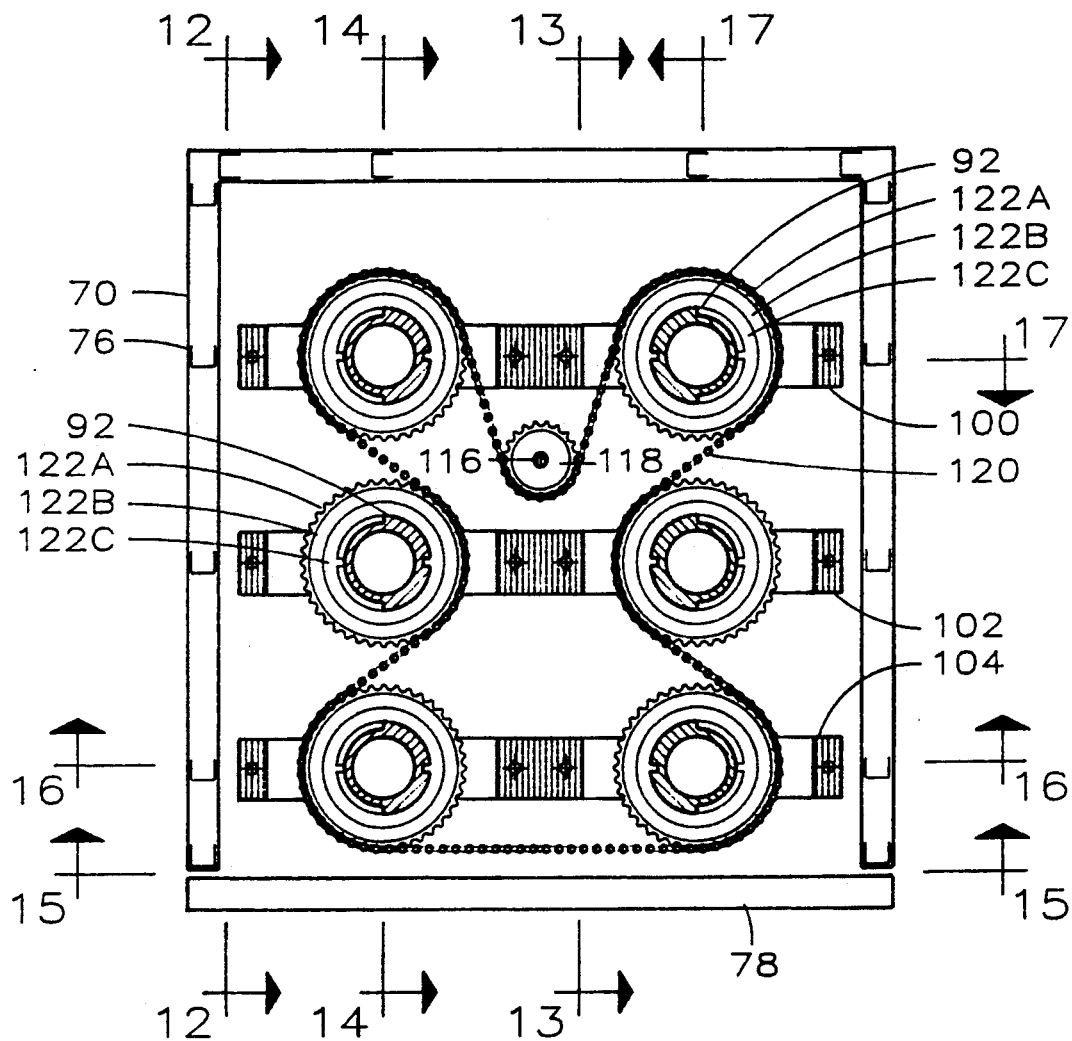
FIG. 10 is a plan view in cross section, taken along section line 10—10 of FIG. 12, of the second preferred embodiment shown in FIG. 7.
Figure 11:
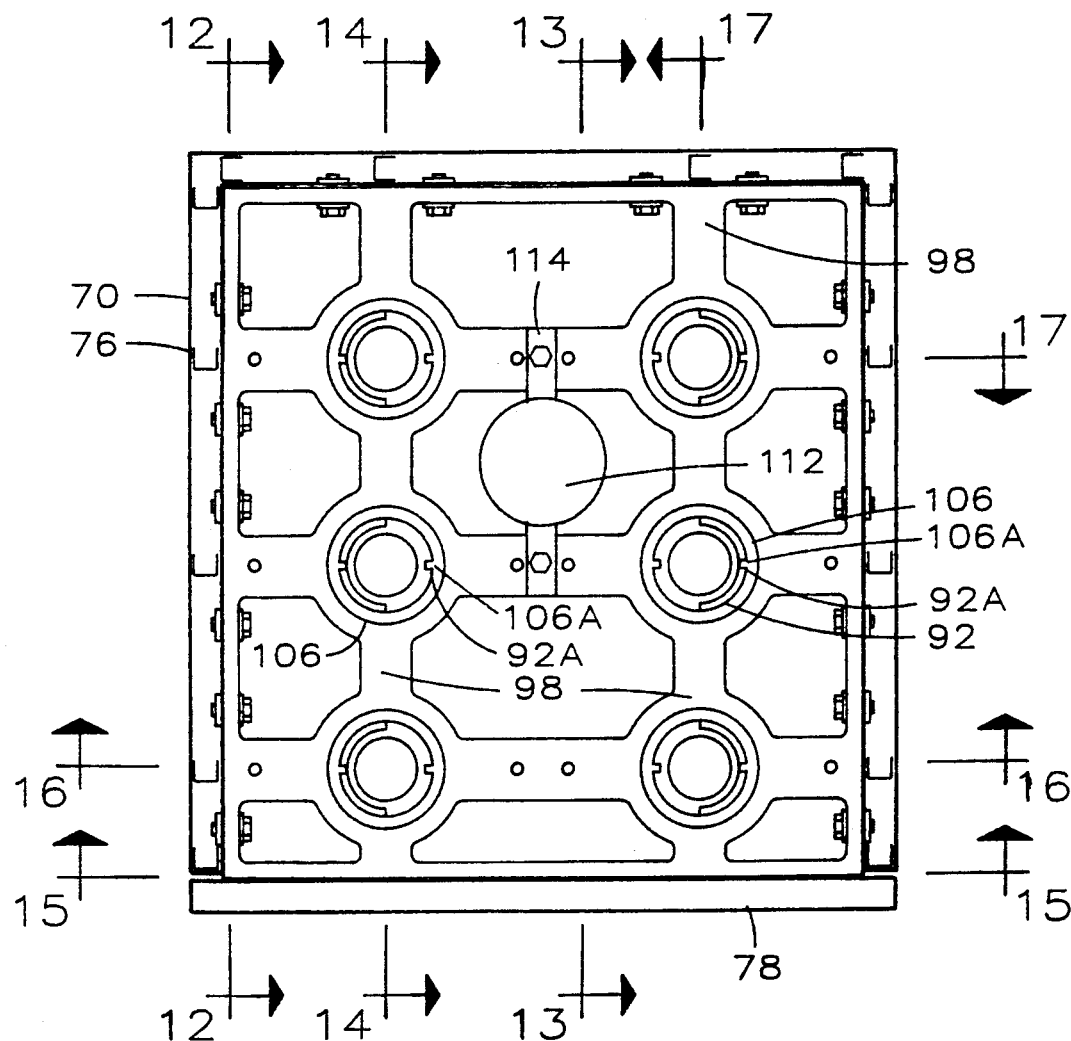
FIG. 11 is a plan view of the second preferred embodiment shown in FIG. 7.
Figure 16:
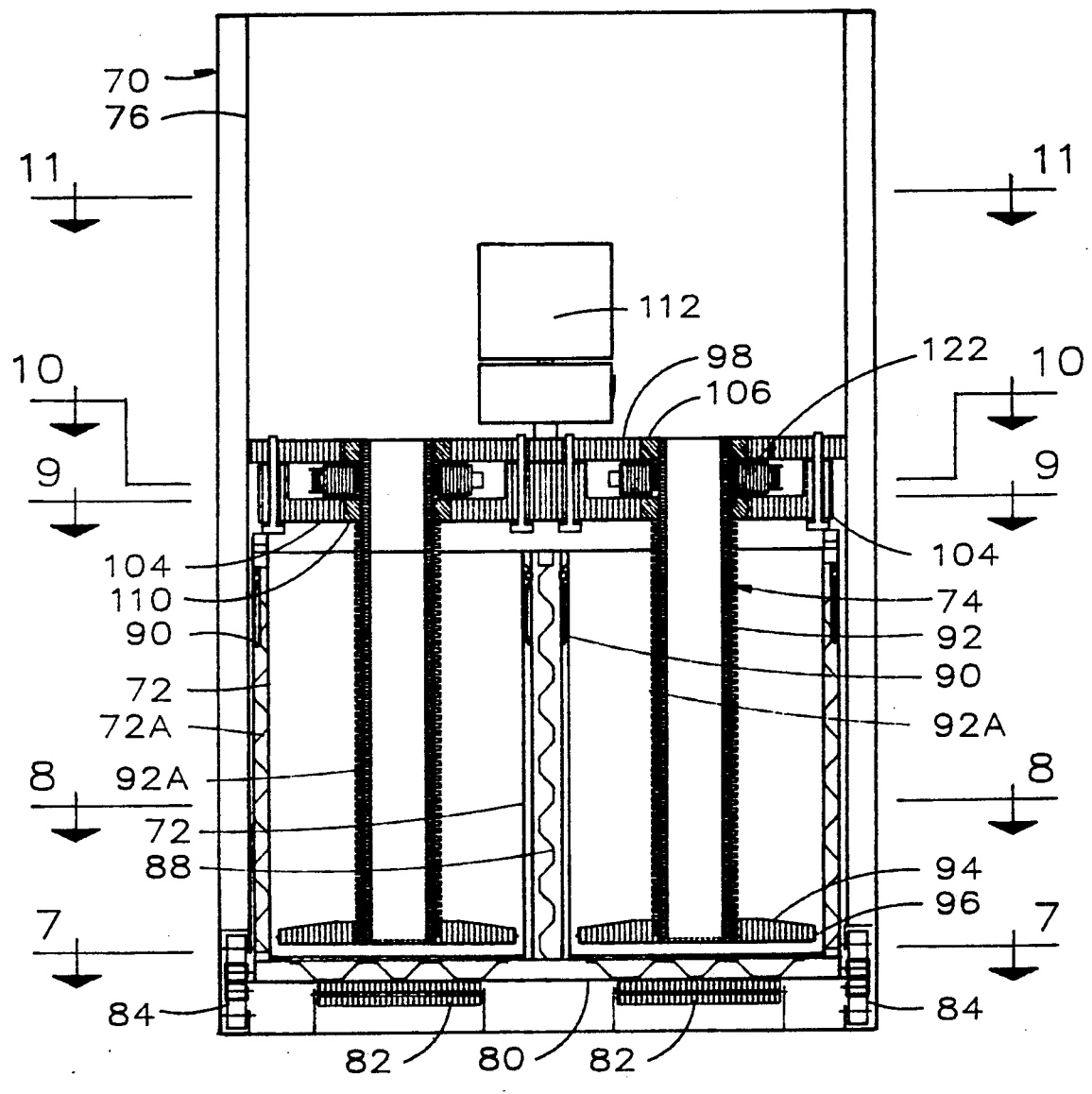
FIG. 16 is an end view in cross section, taken along section line 16—16 of FIG. 7, of the second preferred embodiment shown in FIG. 7.
Figure 17:
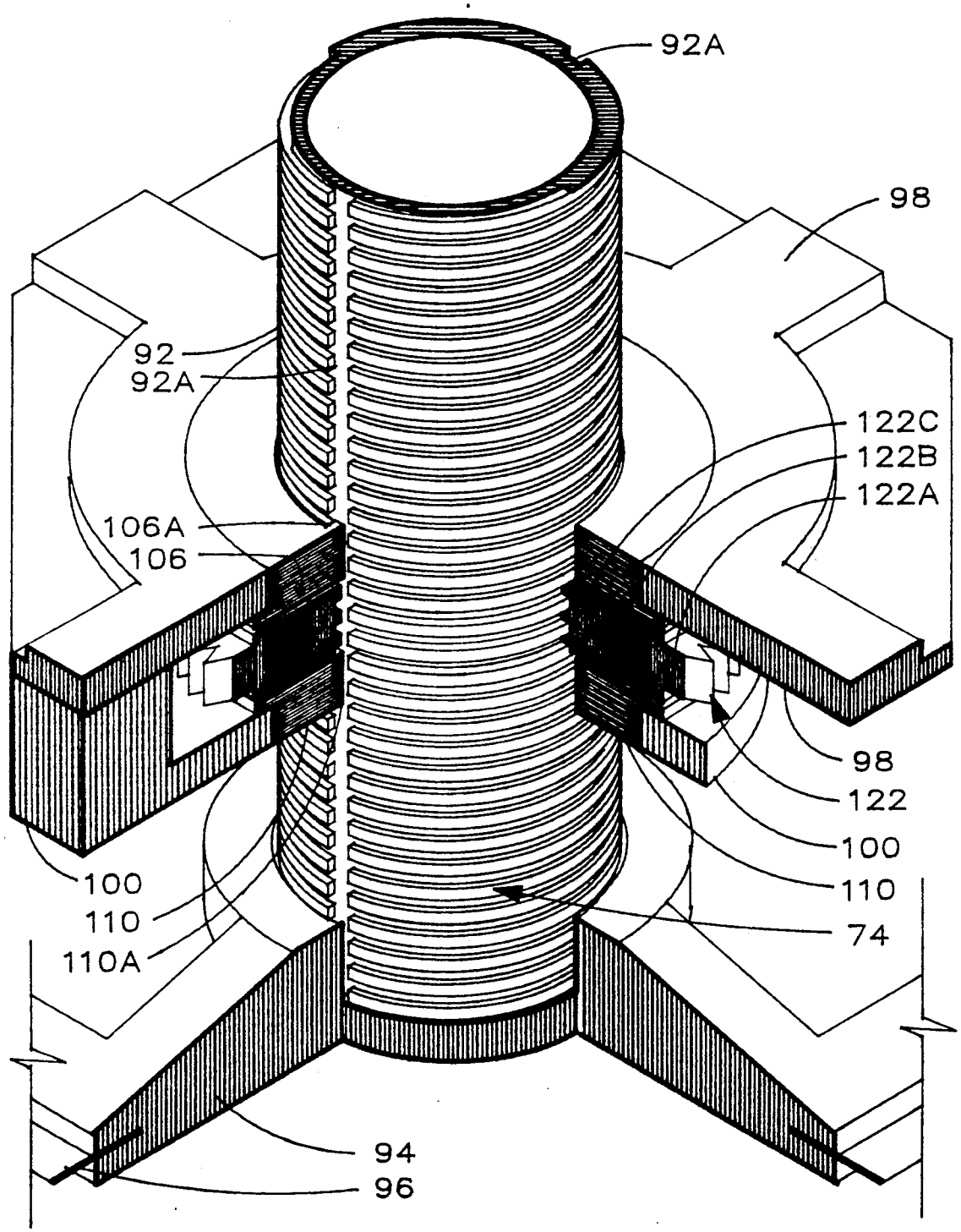
FIG. 17 is an isometric view in partial cross section of the sprocket clutch assembly employed in the preferred embodiments of the present invention.

Solid waste in the receptacles 14 is compacted with a compaction ram 38 that is driven by an electric motor 40. The ram 38 includes an upright, outside-threaded compaction screw 42 having a wedge-shaped compaction pad 44 attached to its lower end. The compaction screw 42 has two keyways 42a and is journalled to an upper frame member 46 and a lower frame member 48 by means of a pair of bushings 50 and 52, which include pairs of integral keys 50a and 52a, respectively (FIGS. 5 and 6). The upper frame member 46 spans the housing 12 and is attached to three of the side walls of the housing 12. The lower frame member 48 is U-shaped and is suspended from the upper frame member 46. The motor 40 is mounted on top of the upper frame member 46, with the drive shaft of the motor 40 extending downwardly through a hole in the upper frame member 46. A drive chain 54 connects a motor drive pulley 56, which is affixed to the downwardly extending shaft of the motor 40, to a sprocket clutch 58 assembly that encircles the threaded screw 42, and which is contained between bushings 50 and 52. The sprocket clutch assembly 58 includes a chain sprocket 58a, a clutch 58b, and an internally threaded shaft sleeve 58c, which engages the threaded screw 42. Details of a virtually identical sprocket clutch assembly are shown in FIG. 17, which is described in further detail below with regard to a second preferred embodiment illustrated in FIGS. 7 through 17.

In operation, the sprocket clutch assembly 58 engages the threaded compaction screw 42 and thereby drives the compaction pad 44 downwardly. Trash or refuse in the underlying receptacle 14 is compacted until it offers sufficient resistance to cause the sprocket clutch 58 to disengage from the compaction screw 42.

The compactor 10 as shown is provided with an open upper end, so that it can be incorporated into a contemporary domestic or commercial kitchen environment, with a counter top of any desired type mounted on top of the compactor and serving to enclose the upper end. In this regard the compactor 10 may be in the nature of modern kitchen cabinets and appliances, with the sizing and height of the compactor being intended to accommodate the standard heights and widths of kitchen counters, cutting boards and the like. Alternatively, the compactor 10 may of course be provided with an independent upper enclosure surface of any desired type.

FIGS. 7 through 17 illustrate a second preferred solid waste compactor 70 constructed in accordance with the present invention. In this embodiment there are six rectangular solid waste receptacles 72, which are substantially identical. Trash in the receptacles 72 is compacted with six substantially identical compaction rams 74, which will be described in part hereinafter by reference to only a single one of the rams 74.

The compactor 70 includes a rectangular, double-walled housing 76 which is open at its upper end in the same manner as the embodiment described above. The housing 76 includes an access door 78 at its front end. The receptacles 72 rest upon a planar, reinforced receptacle carriage 80 (FIG. 16). The carriage 80 rests upon cylindrical, journalled bearing rollers 82. The opposite sides of the carriage 80 are connected to a pair of telescoping cabinet slide assemblies 84, which enable the carriage 80 and the solid waste receptacles 72 to be slid horizontally outwardly through the access door 78. The bearing rollers 82 are constructed to bear the substantial loads transmitted to the waste receptacles 72 and the underlying carriage 80 during compaction of solid waste; whereas the cabinet slide assemblies 84 are constructed to bear the carriage 80 and receptacles 72 as they are slid outwardly from the compactor housing 76 for introduction of solid waste or for removal of the receptacles 72 and disposal of the waste therein.

The carriage 80 further includes two vertical receptacle enclosure walls 86 which enclose the opposite ends of the array of six receptacles 72, and vertical partition walls 88 which separate the receptacles 72 and also properly index the receptacles 72 in their correct positions beneath the compaction rams 74. The enclosure walls 86 as well as the partition walls 88 are corrugated to provide structural reinforcement. The receptacles 72 include corrugated end walls 72a which face outwardly from the array of receptacles 72 when the carriage 80 is withdrawn from the compactor. The receptacles 72 include hinged handles 90 on their reinforced end walls 72a, and also on the oppositely disposed interior end walls, by which the receptacles may be removed from the carriage 80 for disposal of compacted solid waste.

The compaction rams 74 include tubular, outside-threaded compaction screws 92 which are provided with longitudinal keyways 92a. Rectangular compaction plates 94 are affixed to the lower ends of the screws 92. The compaction plates 94 are sized to fit closely within the receptacles 72, and include flexible polymeric edge wipes 96 around their peripheral edges.

The compaction screws 92 are journalled and keyed in a generally horizontal upper frame 98 and three lower frames 100, 102 and 104. The upper frame 98 (best shown in FIGS. 11 and 13) is attached to the housing 76 and includes bores through which the compaction screws 92 pass. Bushings 106, with integral keys 106a, are provided in the bores of the upper frame 98, through which the screws 92 pass.

The lower frames 100, 102 and 104 each depend from the upper frame and are attached thereto by bolts 10. Bores in the lower frames 100, 102 and 104 are provided with bushings 110, through which the compaction screws 92 pass (FIG. 17). The lower bushings 110 include integral keys 110a. The upper and lower keys 106a and 110a engage the keyways 92a and thereby prevent rotation of the compaction screws 92. The upper and lower frames 98-104, together with the upper and lower associated bushings 106 and 110, serve to stabilize and guide the compaction screws 92.

Figure 12:
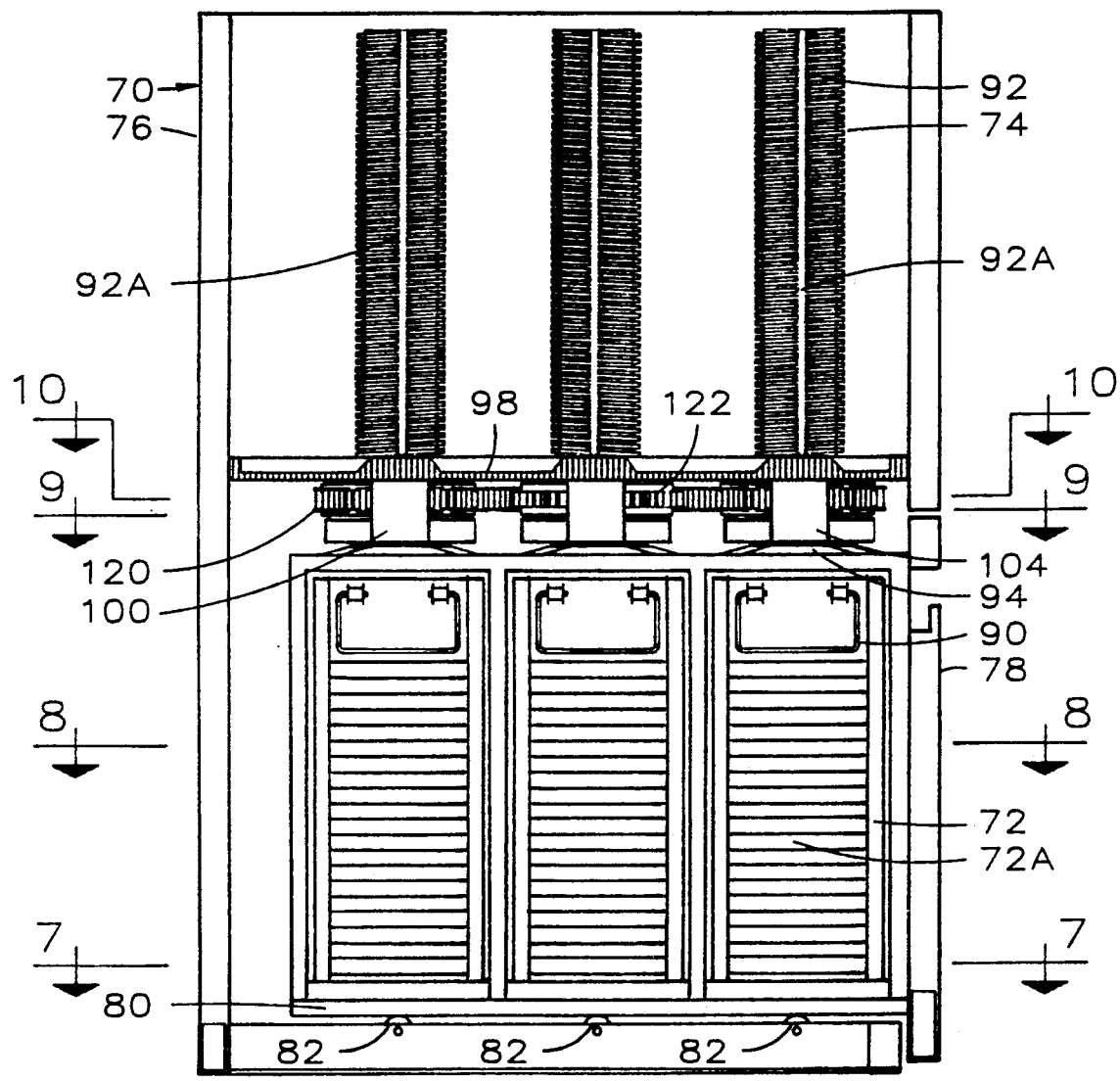
FIG. 12 is a side view in cross section, taken along section line 12—12 of FIG. 7, of the second preferred embodiment shown in FIG. 7.
Figure 13:
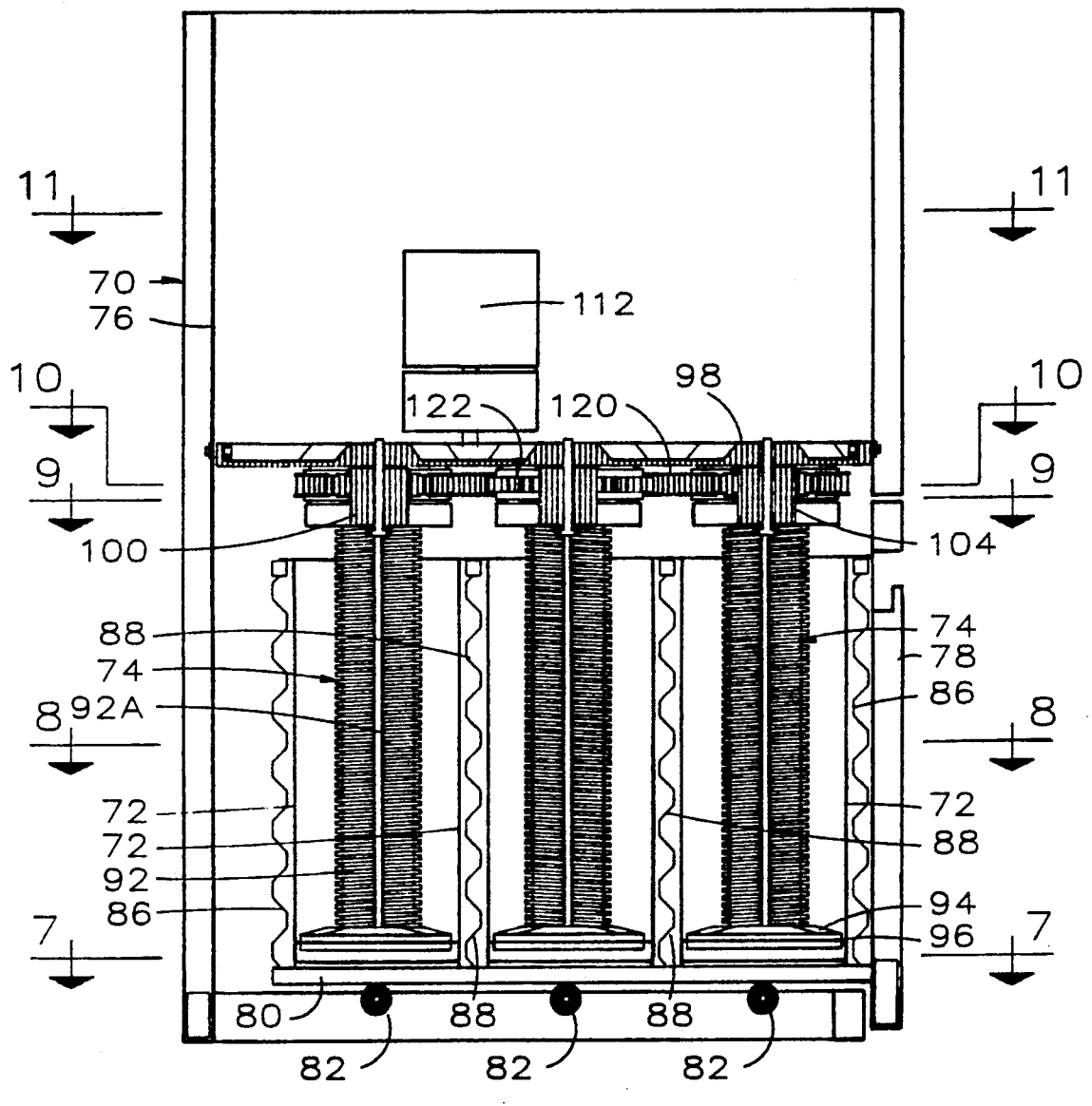
FIG. 13 is a side view in cross section, taken along section line 13—13 of FIG. 7, of the second preferred embodiment shown in FIG. 7, with the compaction rams in the lowered position.
Figure 14:
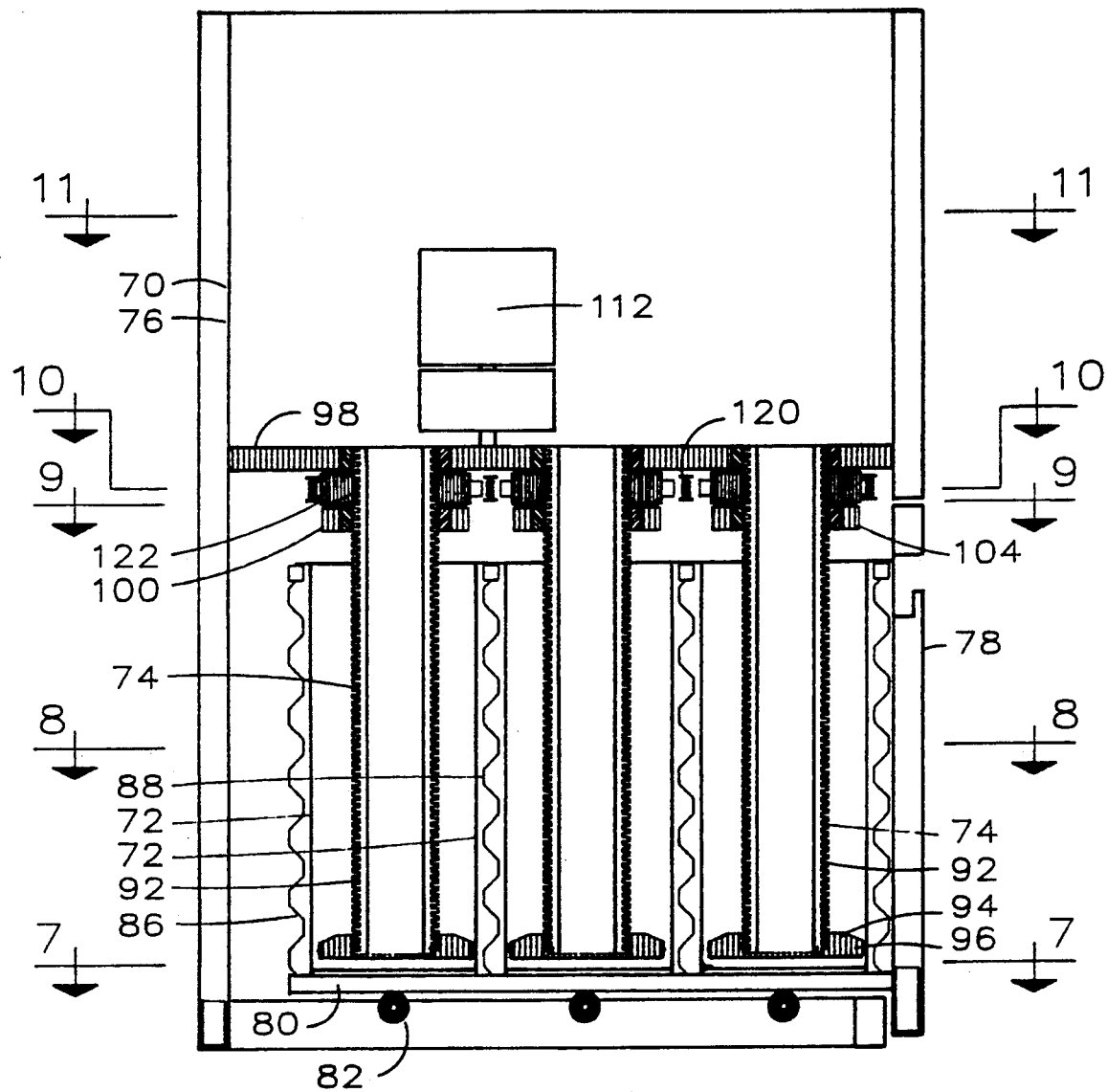
FIG. 14 is a side view in cross section, taken along section line 14—14 of FIG. 7, of the second preferred embodiment shown in FIGS. 7, shown with the compaction rams in the lowered position.
Figure 15:
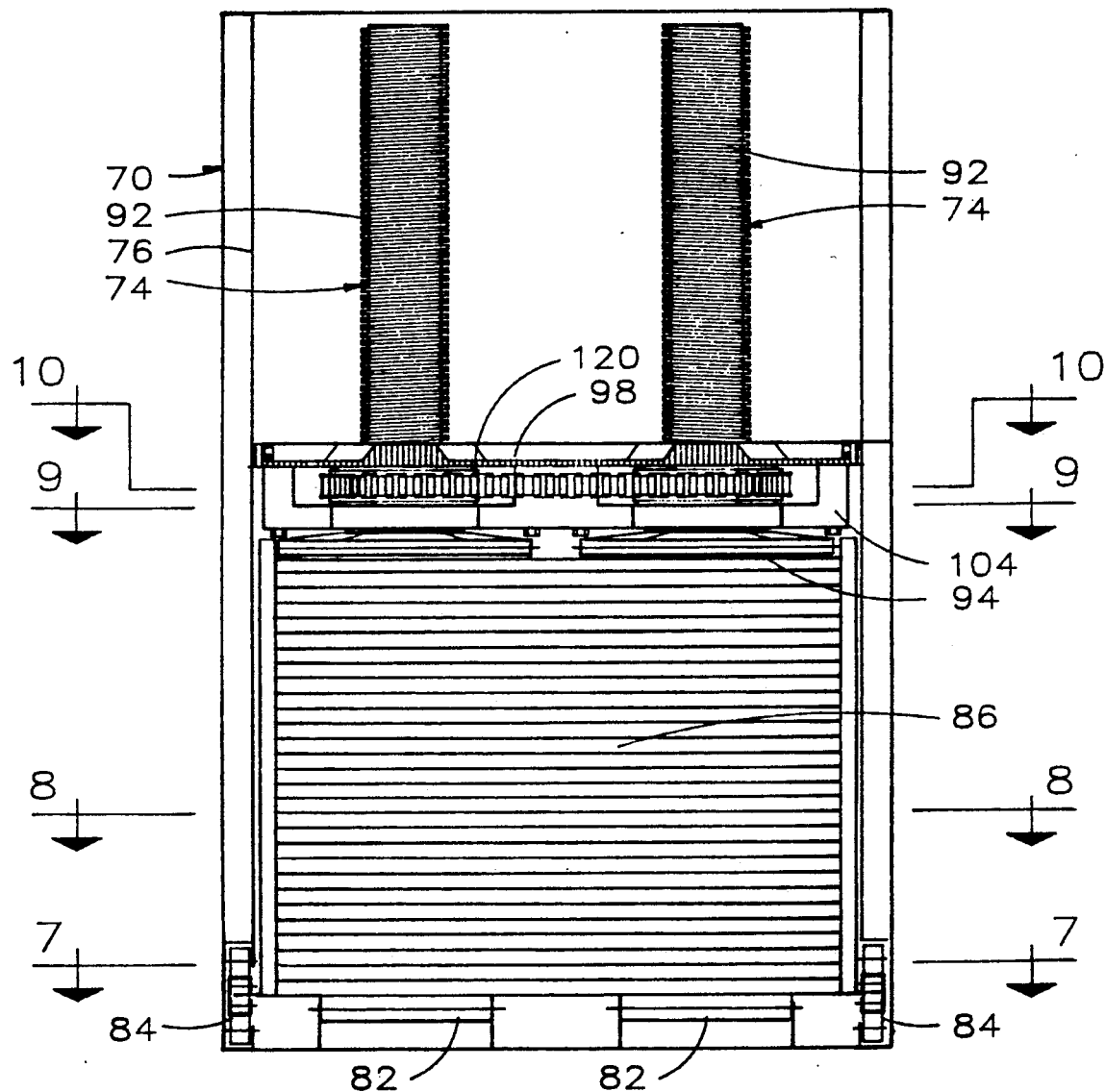
FIG. 15 is an end view in cross section, taken along section line 15—15 of FIG. 7, of the second preferred embodiment shown in FIG. 7, and showing the compaction rams in the raised position.

The compaction rams 74 are driven by an electric motor 112 which includes in integral speed reduction gearbox. The motor 112 is mounted on a cross bar 114, which spans a web in the upper frame 98 (FIG. 11), so as to be centrally located between four of the compaction screws 92. The shaft 116 of the motor 112 extends downwardly through the web in the upper frame 98, and has a drive sprocket 118 attached thereto (FIG. 12, for example). The drive sprocket 118 is located vertically at a height between the upper frame 98 and lower frame 102. The sprocket 118 drives a drive chain 120, which passes around each of six sprocket clutch assemblies 122, which are located on the respective compaction screws 92. Each sprocket clutch assembly 122 includes a chain sprocket 122a, a clutch 122b, and a threaded sleeve 122c (FIG. 17). Rotation of the threaded sleeve 122c causes the screw 92 to be raised or lowered. The sprocket clutch 122b operates to disengage the chain sprocket 122a from the threaded sleeve 122c whenever the load on the sprocket clutch 122b attains a predetermined level.

In operation, the motor 112 is actuated by a manual switch (not shown) that is connected in series to the motor 112 through a door closure interlock switch (not shown), which ensures that the compactor is not operated unless the door 78 is closed. Actuation of the motor 112 causes the sprocket clutch assemblies 122, including the threaded sleeves 122c, to rotate, thereby driving the compaction rams 74 downwardly, compacting any solid waste in the receptacles 72. As the waste in any one of the receptacles 72 is progressively compacted, it offers increasing resistance and thereby increases the load on the corresponding sprocket clutch assembly 122. Upon reaching a predetermined load level, the sprocket clutch assemblies 122 independently disengage the chain 120 from the respective compaction screws 92. The compaction screws 92 will in this manner be disengaged, one by one, until all of the screws 92 have been disengaged or until the motor 112 is deactivated. It will be recognized that the chain 120 and sprockets 122 continue to operate, even though one or more, or all, of the compaction screws 92 may be disengaged. When the mechanism has been actuated for a time period sufficient to fully extend all the screws 92, the motor is disengaged, and a limit switch reverses the direction of the motor 112. The sprocket clutch assemblies 122 are then reengaged, and the compaction rams 74 are raised to their upper positions for storage. As the compaction plates 94 on the lower ends of the screws 92 abut the lower surfaces of the lower frames 100, 102 and 104, the clutch assemblies 122 once again disengage, at which time the compactor reverts to a standby status ready for another compaction cycle.

The sprocket clutch assemblies 122 may be a spring-engaged, bevel-toothed clutch which is released by passive resistance. Alternatively, the clutches may be simple friction clutches, or may be electrically or pneumatically activated by stress sensors.

Figure 18:
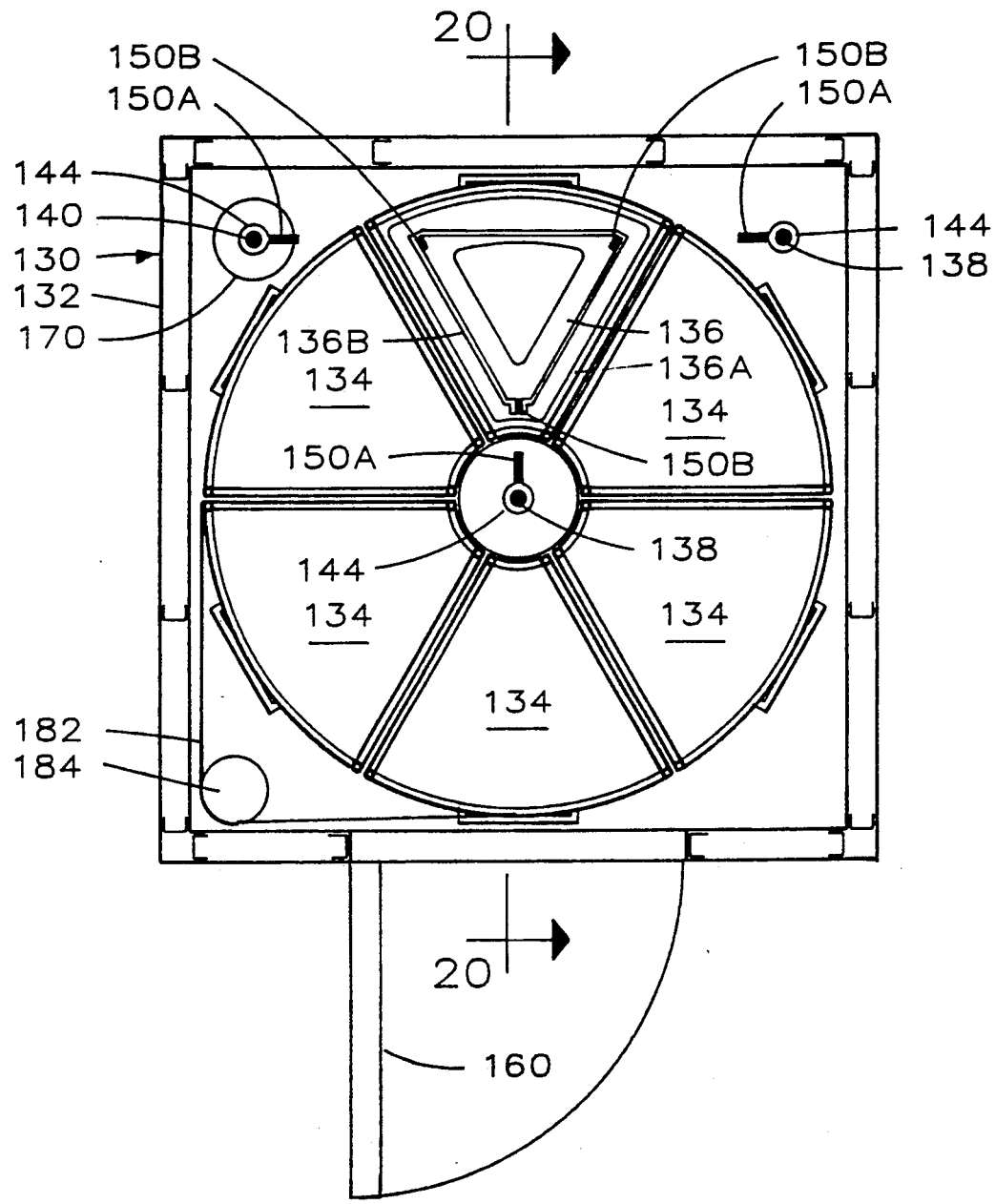
FIG. 18 is a plan view, taken along section line 18—18 of FIG. 20, showing the first preferred embodiment of FIGS. 1 through 6, as modified to include a single compaction ram assembly driven by three spaced screw drives.
Figure 19:
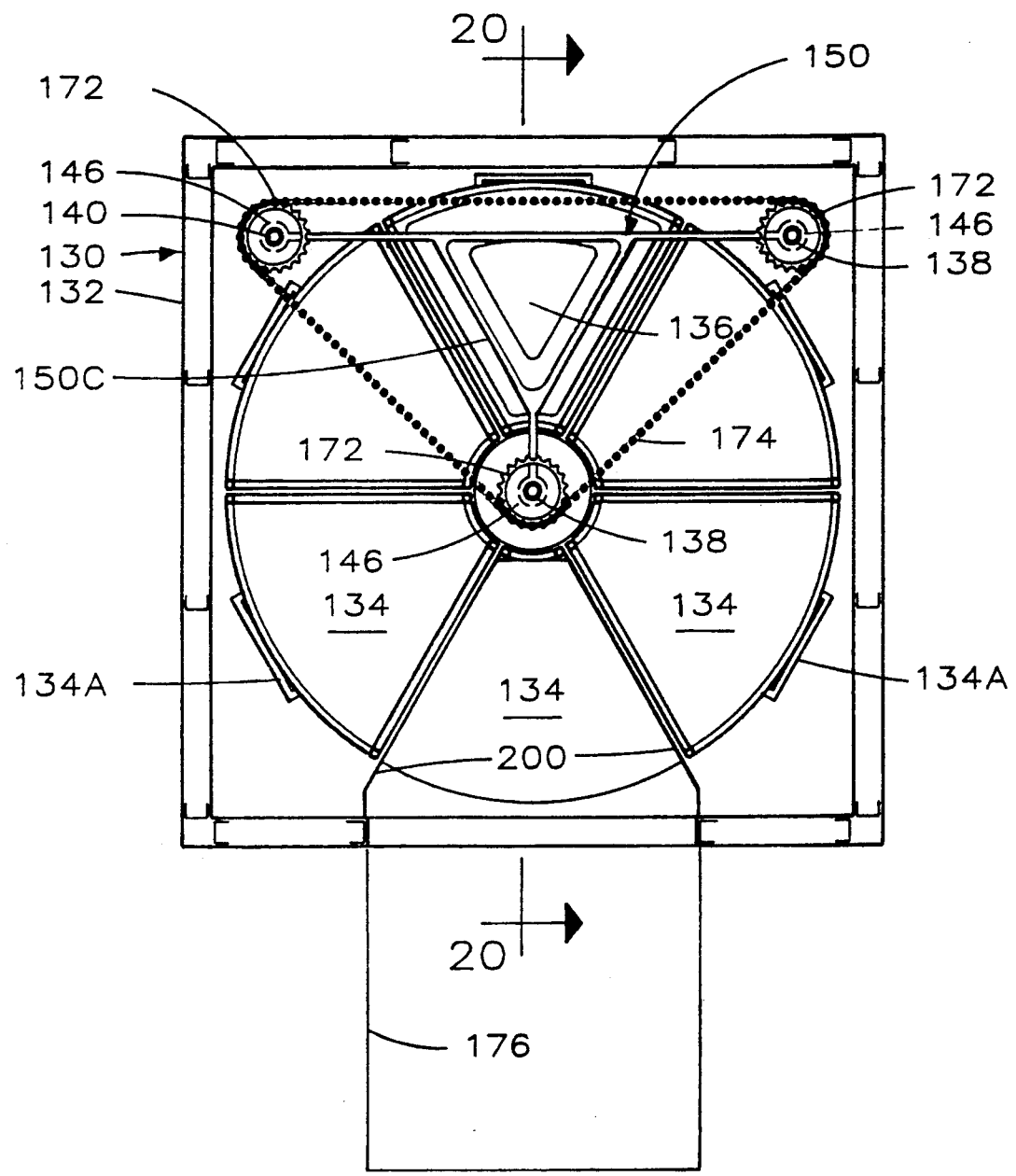
FIG. 19 is a plan view of the embodiment shown in FIG. 18.
Figure 20:
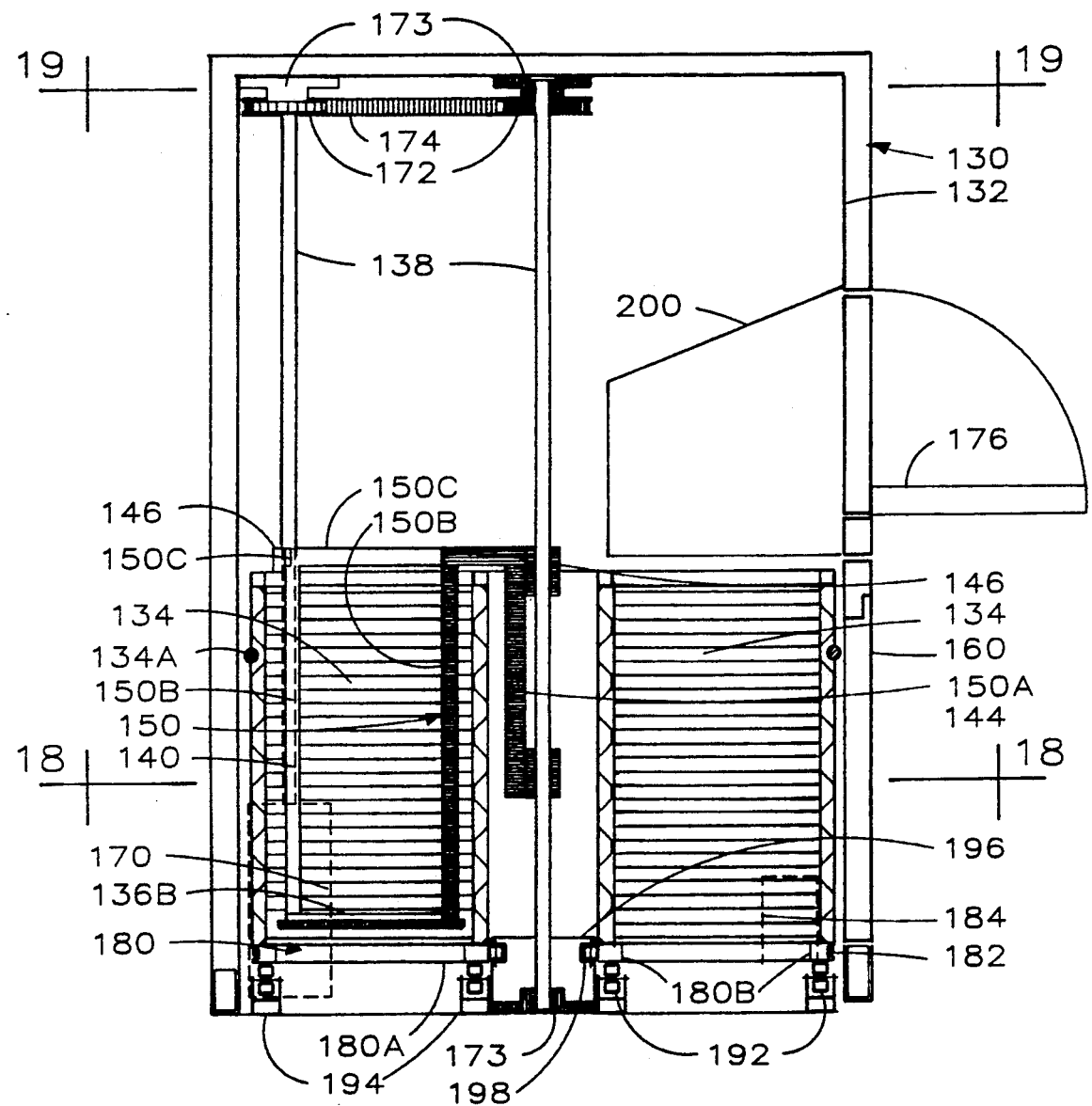
FIG. 20 is a side view in cross section, taken along section lines 20—20 of FIG. 19, of the embodiment shown in FIGS. 18 and 19.

FIGS. 18 through 20 illustrate a compactor 130 which is similar to the first preferred embodiment shown in FIGS. 1 through 6, but which includes a different ram assembly. The compactor 130 includes a double walled enclosure 132, with multiple reinforced waste receptacles 134. The receptacles 134 include handles 134a for removal from the compactor 130. Waste in the receptacles is compacted with a wedge-shaped compaction plate 136, which is sized to fit closely within the receptacles 134 and which includes edge wipers 136a. The compaction plate 136 includes peripheral mounting flanges 136b on their upper surfaces.

The compaction plate 136 is driven by three upright screws, which consist of two compaction screws 138 and a drive screw 140. The three screws 138 and 140 are spaced apart in a triangular array. One of the compaction screws 138 is centrally located and extends along the axis of rotation of the cylindrical array of receptacles 134. The second compaction screw 138 is located in one rear corner of the compactor 130. The drive screw 140 is located at the rear corner of the compactor 130 opposite the corner in which the corner screw 138 is located, such that the two compaction screws 138 and the drive screw 140 are in a triangular array centered on the particular receptacle 134 that is positioned at any given time at the rear of the compactor 130.

On each of the compaction screws 138 and on the drive screw 140 there is engaged a lower drive nut 144 and an upper drive nut 146. The upper and lower nuts 144 and 146 are affixed to a compaction yoke 150, which is generally triangular in construction. Synchronous rotation of the screws 138 and 140 causes the drive nuts 144 and 146 to drive the compaction yoke 150 upwards or downwards.

The compaction yoke 150 includes an integral drive frame 150a, a compaction frame 150b, and a bridge frame 150c. An electric motor 170, which includes an integral reduction gearbox and a load sensing reversing circuit, is mounted in the lower rear corner of the compactor housing 132. The motor 170, through its reduction gearbox, directly drives the drive screw 140. The drive screw 140 includes a drive sprocket 172, and the two compaction screws 138 each also include a driven sprocket 172. The three sprockets 172 are connected by a drive chain 174. Each of the compaction screws 138 and the drive screw 140 includes at its upper end a compression screw mount 173 and associated bearing, which is affixed to the compactor housing 132.

The compactor 130 includes a trash deposit door 176, by which solid waste, trash or refuse may be introduced into whichever of the receptacles 134 is positioned beneath the door 176 at any particular time. The receptacles 134 are mounted on a circular, rotatable carousel 180, which includes radial reinforcing ribs 180a and concentric reinforcing ribs 180b. The compactor 130 also includes a receptacle door 160, by which the receptacles 134 may be removed from the compactor 130 for emptying. A receptacle indexing belt 182 extends around the periphery of the carousel 180, and connects the carousel 180 to an indexing motor 184 and associated pulley. The carousel 180 is mounted on roller bearings 192 which travel in a circular track 194. The carousel 180 further includes a central sleeve 196, with radial rollers 198. A waste loading hopper 200 guides waste from the door 176 into an underlying receptacle 134.

The compaction frame 150b of the yoke 150 is connected to the compaction plate mounting flange 136b. During operation the compaction frame 150b of the yoke 150 extends downwardly into the immediately underlying receptacle 134. The compaction frame 150b serves to absorb irregular loads caused by compaction of waste which contains irregularly shaped or irregularly distributed objects in the receptacles 134, which tend to induce twisting loads on the compaction plate 136. Thus the use of the three spaced screws 138 and 140 tends to distribute and thereby reduce the effect of twisting loads during compaction.

Industrial Applicability

The present invention is of particular utility in the effective disposal or recycling of segregable classes of trash, refuse or other solid waste, including for example paper, clear glass, colored glass, aluminum cans and tin-coated steel cans.

The embodiments of the invention in which patent protection is claimed are as follows:

1. A solid waste compactor comprising a housing, a plurality of upwardly opening solid waste receptacles mounted on a rotatable circular carousel journalled within said housing, compaction ram means supported by said housing and operable to compact downwardly solid waste contained in said receptacles, said compaction ram means including three triangularly spaced drive screws, one of said screws extending along the axis of said carousel and the other two screws extending upright outside the perimeter of said circular carousel, said compaction yoke including a downwardly extending compaction ram, an electric motor mounted within said housing and connected to said compaction ram means, said electric motor being operable to selectively drive said compaction ram means downwardly into said receptacles and to raise said compaction ram means upwardly into a storage position, and whereby said receptacles may be successively rotated into position beneath said compaction ram means for compaction of solid waste contained in said receptacles.

2. The solid waste compactor defined in claim 1 wherein said compaction ram of said compaction yoke includes an integral compaction frame which extends downwardly, a wedge-shaped compaction plate affixed to the lower end of said downwardly extending compaction frame, and wherein said compaction yoke includes upper and lower drive nuts engaged with said three drive screws.

3. The solid waste compactor defined in claim 2 further including an indexing motor and drive belt coupled to said carousel for rotating said receptacles into position beneath said compaction yoke.

4. The solid waste compactor defined in claim 3 wherein said compaction yoke includes an integral drive frame which is engaged to said screws by said drive nuts, said drive frame being adjacent to and spaced from said compaction frame, whereby said drive frame extends downwardly on said drive screws adjacent the outside of one of said receptacles during compaction of waste in said receptacle.

* * * * *